United States Patent
Seder et al.

(10) Patent No.: US 12,111,469 B2
(45) Date of Patent: Oct. 8, 2024

(54) POLARIZATION ADAPTIVE WAVEGUIDE HUD

(71) Applicant: GM Global Technology Operations LLC, Detroit, MI (US)

(72) Inventors: Thomas A. Seder, Fraser, MI (US); Kai-Han Chang, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 543 days.

(21) Appl. No.: 17/481,900

(22) Filed: Sep. 22, 2021

(65) Prior Publication Data

US 2023/0091935 A1    Mar. 23, 2023

(51) Int. Cl.
G02B 27/01    (2006.01)
G02B 5/30    (2006.01)
G03H 1/00    (2006.01)

(52) U.S. Cl.
CPC ....... *G02B 27/0172* (2013.01); *G02B 5/3083* (2013.01); *G03H 1/0005* (2013.01); *G02B 2027/0174* (2013.01); *G03H 2001/0088* (2013.01)

(58) Field of Classification Search
CPC .............. G02B 27/0172; G02B 5/3083; G02B 2027/0174; G02B 6/0056; G02B 5/04; G02B 27/0018; G03H 1/0005; G03H 2001/0088; G03H 2223/16; G03H 2223/20; G03H 2001/2239; G03H 2001/2284; G03H 1/2205; G03H 1/2294; G03H 2223/18; G03H 2223/22; G02F 2203/62; G02F 1/133502; G02F 1/133524; G02F 1/133638; G02F 1/1313; G02F 1/1326

See application file for complete search history.

(56) References Cited

U.S. PATENT DOCUMENTS

| | | | |
|---|---|---|---|
| 8,982,471 B1 | 3/2015 | Starner et al. | |
| 2010/0201789 A1* | 8/2010 | Yahagi | H04N 13/139 348/51 |
| 2019/0086674 A1* | 3/2019 | Sinay | G02B 27/0172 |
| 2019/0241070 A1 | 8/2019 | Ota et al. | |
| 2020/0292745 A1* | 9/2020 | Waldern | G02B 6/0068 |
| 2021/0041610 A1* | 2/2021 | Saitoh | G02F 1/291 |

FOREIGN PATENT DOCUMENTS

| | | |
|---|---|---|
| JP | H04352124 A | 12/1992 |
| WO | 2019189675 A1 | 10/2019 |

* cited by examiner

*Primary Examiner* — Mustak Choudhury
(74) *Attorney, Agent, or Firm* — Vivacqua Crane, PLLC

(57) ABSTRACT

A head-up display system includes a hologram projector adapted to project a holographic image, a waveguide positioned in front of the hologram projector, wherein the holographic image projected by the hologram projector passes through the waveguide, a glare control prism positioned in front of the waveguide assembly, and a waveplate positioned between the waveguide and the glare control prism, the waveplate adapted to adjust the polarization of the holographic image.

20 Claims, 3 Drawing Sheets

POLARIZATION ADAPTIVE WAVEGUIDE HUD

INTRODUCTION

The present disclosure relates to a waveguide for a head-up display having a glare control prism that includes a waveplate to allow easy adaptation of the waveguide for varying applications.

Head up displays (HUDs) are used in automobiles to reduce the amount of time a driver of the automobile spends looking away from the road to traditional dash mounted, or head down displays/gages. This advantage helps improve the situational awareness, and reduces reaction time. There exist many versions of HUDs where the simplest consist of using a smartphone sitting on a dashboard with the image reflected by the windshield into the driver's eyes. Unfortunately, this version does not provide the image at the same focal distance as the road, forcing the eye to accommodate. Newer HUD systems use a combiner with a dichroic mirror, or a hologram, to reflect a collimated image into the user's eyes. This method effectively overlays an image onto the far field by using a system of lenses to expand and collimate an image from a projector. In such systems the size of the projected image is limited by the size of the projection optics, resulting in relatively small HUD images in automobiles.

One way to improve this is to use a planar waveguide where the image is injected using a hologram. The light then propagates inside the waveguide and is extracted multiple times by another hologram. The re-circulation of the light several times within the waveguide expands the pupil so the viewer can see the image from an extended eye-box. By adding a redirection hologram that turns the light inside the waveguide, the pupil is expended in both vertical and horizontal dimensions. In addition to expanding the eye-box, these systems also magnify the original image coming out of the projector thanks to the injection hologram which acts as a lens. The advantage over the classical configuration is that the projector is now located near the waveguide and can be extremely compact. Using this technique the field of view of the HUD system can be increased.

Since polarized sunglasses transmit only p-polarized light, and windshield HUDs reflect substantially more s-polarized light it is necessary to alter the ratio of s-to-p polarized HUD light incident on the windshield to accommodate polarized sunglass wearers. Thus, HUD systems are designed to provide a ratio of s-to-p polarization that is at a pre-defined ratio ranging from 5:1 to 15:1, such as 10:1 to accommodate drivers wearing polarized sunglasses. In addition, the rake angle of the windshield in an automobile changes the s-to-p polarization ratio. Therefore, HUD systems must be designs uniquely for each different automotive application.

Thus, while current HUD systems achieve their intended purpose, there is a need for a new and improved system that uses a waveguide having a glare control prism that includes a waveplate that is easily adaptable to provide an appropriate s-to-p polarization ratio, wherein a standard HUD system using a common waveguide and glare prism can be tuned for various applications simply by modifying the waveplate.

SUMMARY

According to several aspects of the present disclosure, a head-up display system includes a hologram projector adapted to project a holographic image, a waveguide positioned in front of the hologram projector, wherein the holographic image projected by the hologram projector passes through the waveguide, a glare control prism positioned in front of the waveguide assembly, and a waveplate positioned between the waveguide and the glare control prism, the waveplate adapted to adjust the polarization of the holographic image.

According to another aspect, the glare control prism is adapted to allow the holographic image projected by the hologram projector to pass from the waveguide through the glare control prism and to prevent ambient light that hits the glare control prism from passing through the glare control prism to the waveguide.

According to another aspect, the waveplate is adapted to adjust the ratio of s-polarization to p-polarization in the holographic image projected through the waveplate.

According to another aspect, the waveplate is adapted to adjust the ratio of s-polarization to p-polarization in the holographic image projected through the waveplate to a pre-determined ratio.

According to another aspect, the waveplate includes an inorganic birefringent film.

According to another aspect, the inorganic birefringent film comprises columnar nanostructures.

According to another aspect, the columnar nanostructures are formed on the waveplate by oblique deposition.

According to another aspect, the inorganic birefringent film is grown directly on the glare control prism.

According to another aspect, the inorganic birefringent film is laminated to the glare control prism.

According to another aspect, the waveplate comprises a liquid crystal lens connected to a voltage source, wherein the birefringent characteristics of the liquid crystal lens vary as the voltage supplied to the liquid crystal lens is varied.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
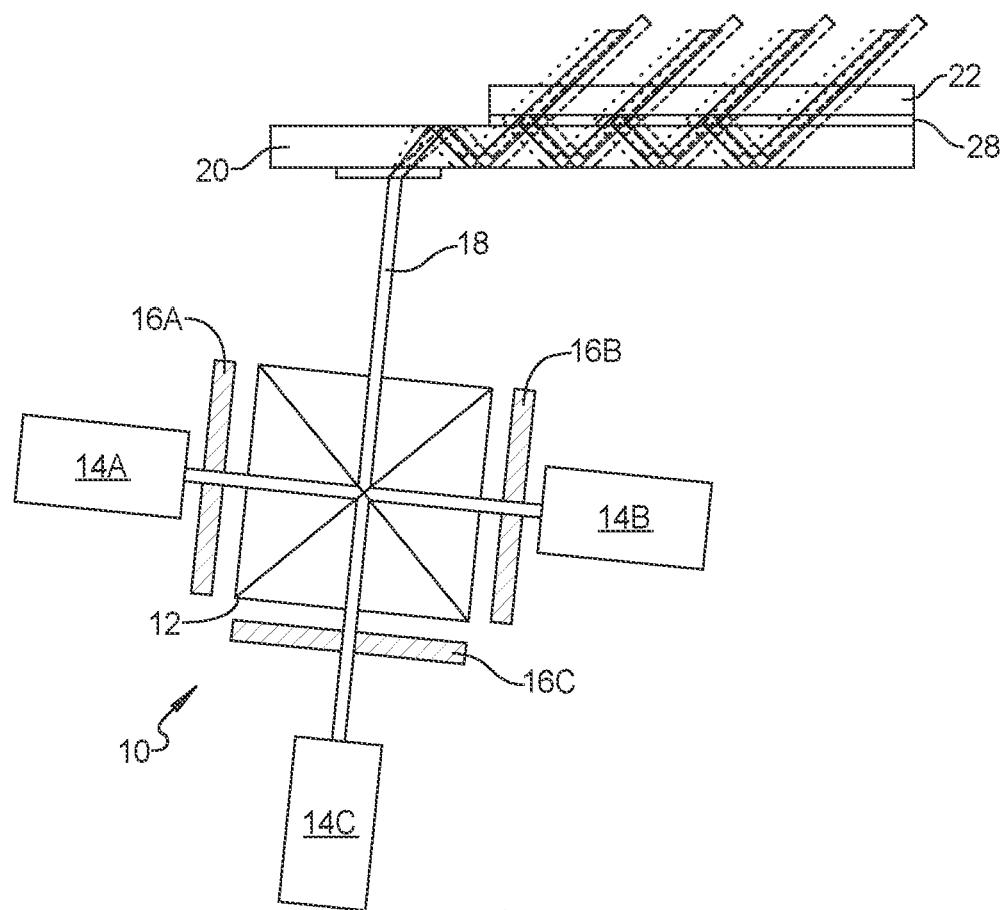
FIG. 1 is a schematic illustration of a head-up display system according to an exemplary embodiment of the present disclosure.

Referring to FIG. 1, a head-up display (HUD) system 10 according to the present disclosure includes a hologram projector 12 that is adapted to project a holographic image 18. In an exemplary embodiment, the hologram projector 12 includes a red laser 14A and a first spatial light modulator 16A associated with the red laser 14A, a green laser 14B and a second spatial light modulator 16B associated with the green laser 14B, and a blue laser 14C and a third spatial light modulator 16C associated with the blue laser 14C. Each of the red, green and blue lasers 14A, 14B, 14C project through the associated spatial light modulators 16A, 16B, 16C and collimated into a holographic image 18 that is projected outward.

In an exemplary embodiment, the hologram projector 12 includes a wave guide 20 positioned in front of the hologram projector 12, wherein the holographic image 18 projected by the hologram projector 12 passes through the waveguide 20. The holographic image 18 is projected into the waveguide 20 and then propagates inside the waveguide 20 and is extracted multiple times. The re-circulation of the light several times within the waveguide 20 expands the pupil so the viewer can see the holographic image 18 from an extended eye-box. In addition to expanding the eye-box, the waveguide 20 also magnifies the original projected image coming out of the hologram projector 12.

Figure 2:
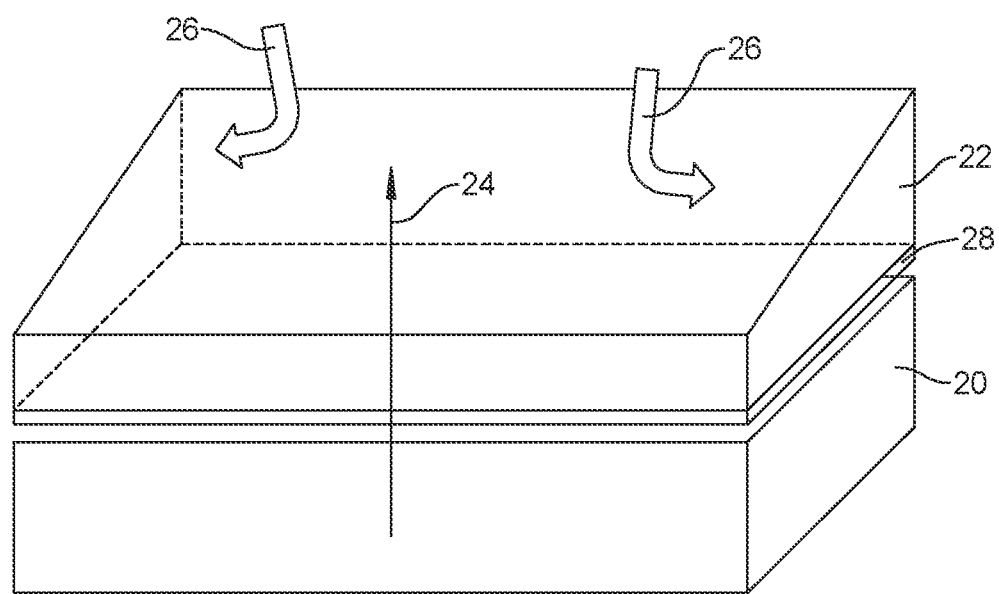
FIG. 2 is a perspective view of a waveguide assembly according to an exemplary embodiment.

Referring to FIG. 2, a glare control prism 22 is positioned in front of the waveguide 20 assembly. The glare control prism 22 is adapted to allow the holographic image 18 projected by the hologram projector 12 to pass from the waveguide 20 through the glare control prism 22, as indicated by arrow 24, and to prevent ambient light that hits the glare control prism 22 from passing through the glare control prism 22 to the waveguide 20, as indicated by arrows 26.

Figure 3:
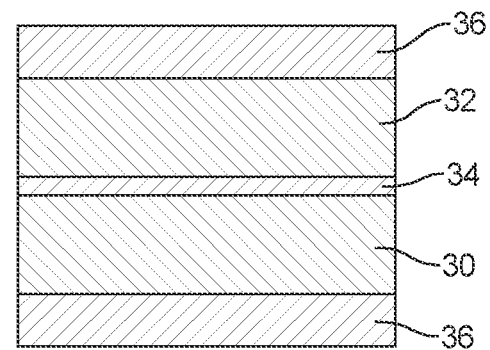
FIG. 3 is a cross sectional view of a waveplate according to an exemplary embodiment.

A waveplate 28 is positioned between the waveguide 20 and the glare control prism 22. The waveplate 28 is adapted to adjust the polarization of the holographic image 18. Referring to FIG. 3, the waveplate 28 includes a substrate layer 30, and a retardation layer 32. A matching layer 34 is disposed in between and interconnecting the substrate layer 30 and the retardation layer 32. A layer of anti-reflective coating 36 is applied to outer surfaces of the retardation layer 32 and the substrate layer 30. The waveplate 28 is an optical device that alters the polarization state of a light wave travelling through it.

Light is an electromagnetic wave, and the electric field of this wave oscillates perpendicularly to the direction of propagation. Light is called unpolarized if the direction of this electric field fluctuates randomly in time. Many common light sources such as sunlight, halogen lighting, LED spotlights, and incandescent bulbs produce unpolarized light. If the direction of the electric field of light is well defined, it is called polarized light. The two orthogonal linear polarization states that are most important for reflection and transmission are referred to as p-polarization and s-polarization. P-polarized light has an electric field polarized parallel to the plane of incidence, while s-polarized light is perpendicular to this plane.

Birefringent polarizers rely on the dependence of the refractive index on the polarization of light. Different polarizations will refract at different angles and this can be used to select certain polarizations of light. In an exemplary embodiment, the waveplate 28 is a birefringent polarizer that is adapted to adjust the ratio of s-polarization to p-polarization in the holographic image 18 projected through the waveplate 28. To accommodate drivers wearing polarized sun-glasses, HUD systems are designed to project the holographic image 18 to the eye of the driver having a ratio of s-polarization to p-polarization at a pre-determined ratio that is between 5:1 and 15:1. By way of example, the pre-determined ratio may be 10:1. By appropriate choice of the relationship between the birefringent characteristics of the waveplate 28, it is possible to introduce a controlled phase shift between the two polarization components of a light wave, thereby altering the ratio of s-polarization to p-polarization of a holographic image 18 projected through the waveplate 28.

When light is incident on an interface between two different media with different indexes of refraction, some of the light is reflected and some is transmitted. When the angle of incidence is not normal, different polarizations are reflected (and transmitted) by different amounts. Thus, when a holographic image 18 is projected to and reflected from the inner surface of a windshield in an automobile to the eyes of the driver, the ratio of s-polarization to p-polarization will be affected. The change to the ratio of s-polarization to p-polarization is dependent on the angle of the windshield. Because of this, the ratio of s-polarization to p-polarization of the holographic image 18 projected from the waveguide 20 and the waveplate 28 must be adjusted to accommodate for the ratio change when the holographic image 18 reflects from the inner surface of the windshield to ensure that the ratio of s-polarization to p-polarization of the holographic image 18 received by the driver's eyes is at the appropriate pre-determined ratio, such as 10:1 as discussed above.

Figure 4A:
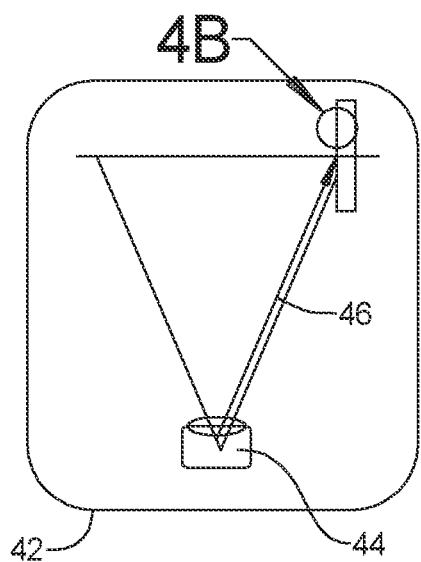
FIG. 4A is a schematic view of an oblique deposition process used to create inorganic nanostructures on a waveplate according to an exemplary embodiment.
Figure 4B:
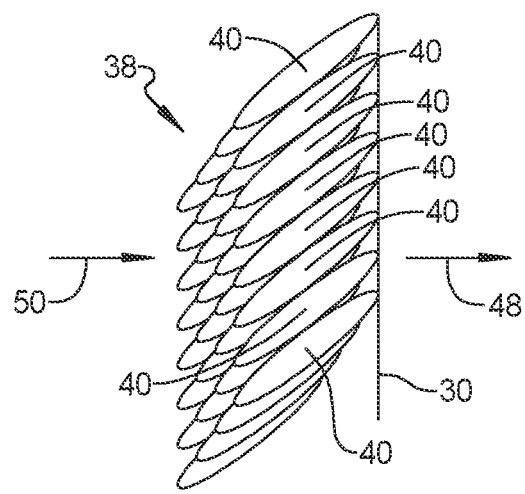
FIG. 4B is an enlarged view of a portion of the inorganic nanostructures formed on the waveplate in FIG. 4A.

In an exemplary embodiment, the retardation layer 32 of the waveplate 28 includes an inorganic birefringent film 38. The inorganic birefringent film 38 may include columnar nanostructures 40 formed on the waveplate 28 by oblique deposition. Referring to FIG. 4A, a waveplate 28 substrate layer 30 is positioned within an evaporative chamber 42 in proximity to an evaporative source 44. Molecules of inorganic material evaporate and propagate to the substrate layer 30, as shown by arrow 46. Columnar nanostructural growth on the substrate layer 30 results in columnar nanostructures 40 extending from the surface of the substrate layer 30, as shown in FIG. 4B.

The columnar structure of inorganic material formed on the substrate layer 30 defines a birefringent film 38 that retards the propagation of the holographic image 18 through the retardation layer 32 resulting in an adjustment to the ratio of s-polarization and p-polarization of the holographic image 18 that leaves the waveplate 28, as indicated by arrow 48, as compared to the ratio of s-polarization and p-polarization of the holographic image that entered the waveplate, as indicated by arrow 50.

By controlling the thickness and angular orientation of the columnar nanostructures 40, the ratio of s-polarization and p-polarization of the holographic image 18 projected from the waveguide 20 can be tuned for a particular application, taking into account the angle of the windshield. The waveguide 20 and the glare control prism 22 can be used commonly across any application, while only the waveplate 28 needs to be adjusted to accommodate for various vehicle specific applications.

In an exemplary embodiment, the inorganic birefringent film 38 is grown directly on the glare control prism 22. In another exemplary embodiment, the inorganic birefringent film 38 is formed separately and then laminated to the glare control prism 22.

Figure 5A:
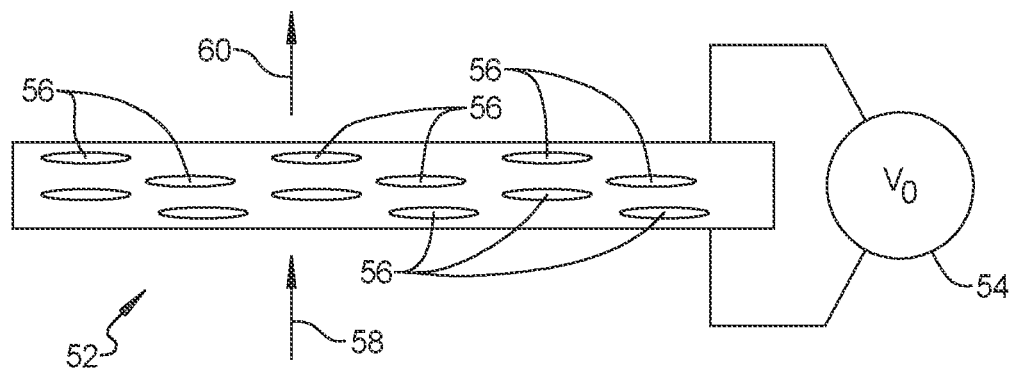
FIG. 5A is a schematic view of a liquid crystal lens according to an exemplary embodiment, wherein liquid crystal molecules are not rotated.

In an exemplary embodiment, the retardation layer 32 of the waveplate 28 includes a liquid crystal lens 52 connected to a voltage source 54, wherein the birefringent characteristics of the liquid crystal lens 52 vary as the voltage supplied to the liquid crystal lens 52 is varied. Birefringent characteristics of the liquid crystal lens 52 are manipulated by changing the orientation of liquid crystal molecules 56 within the liquid crystal lens 52 when voltage supplied to the liquid crystal lens 52 is varied. Referring to FIG. 5A, a liquid crystal lens 52 is shown wherein the liquid crystal molecules 56 within the liquid crystal lens 52 are rotatable. The voltage source 54 provides electrical current to the liquid crystal lens 52.

Figure 5B:
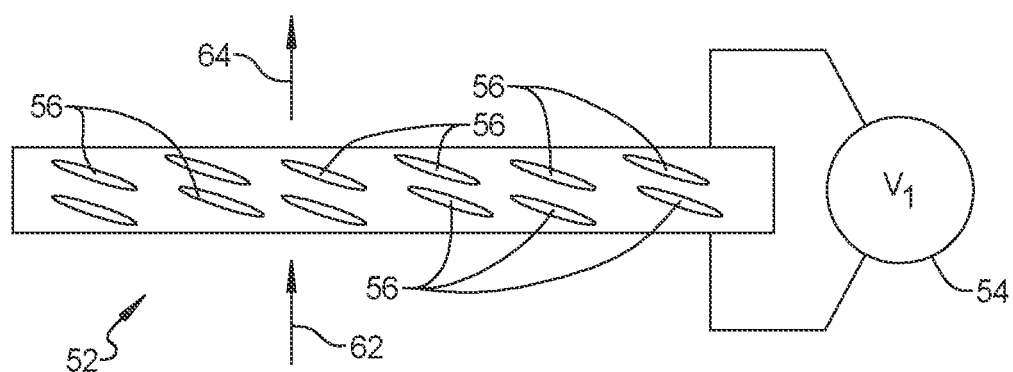
FIG. 5B is a schematic view of the liquid crystal lens shown in FIG. 5A, wherein the liquid crystal molecules are rotated.

As shown in FIG. 5A, when the voltage is zero, $V_0$, the liquid crystal molecules 56 are oriented such that the ratio of s-polarization to p-polarization of the holographic image 18 entering the waveplate 28, as indicated by arrow 58, is the same as the ratio of s-polarization to p-polarization of the holographic image 18 leaving the waveplate 28, as indicated by arrow 60. Referring to FIG. 5B, when voltage is applied, $V_1$, the liquid crystal molecules 56 rotate such that the ratio of s-polarization to p-polarization of the holographic image 18 entering the waveplate 28, as indicated by arrow 62, is different than the ratio of s-polarization to p-polarization of the holographic image 18 leaving the waveplate 28, as indicated by arrow 64.

By adjusting the voltage from the voltage source 54, the amount of rotation can be controlled to achieve a desired ratio of s-polarization to p-polarization of the holographic image 18 leaving the waveplate 28. A liquid crystal lens 52 of this type can be used to rapidly change the angle of polarization in response to an electric signal, and can be used for rapid polarization state adjustments with high accuracy. This allows active control of the ratio of s-polarization to p-polarization of the holographic image 18 leaving the waveplate 28, such that the waveplate 28 can be tuned for specific applications.

The liquid crystal lens 52 may be controlled in electrically controllable birefringence (ECB) mode or twisted nematic (TN) mode. Electrically controllable birefringence mode uses the applied voltage to change the tilt of the liquid crystal molecules 56, as a result, the birefringence is changed as a function of the tilt angle. Twisted nematic mode is based on the precisely controlled realignment of liquid crystal molecules 56 between different ordered molecular configurations under the action of an applied electric field.

A head-up display system of the present disclosure offers the advantage of being able to tune the ratio of s-polarization to p-polarization of the holographic image 18 leaving the waveplate 28 by modifying or adjusting, via, voltage control, the waveplate 28. The waveguide 20 and the glare control prism 22 can be used commonly across any application, while only the waveplate 28 needs to be adjusted to accommodate for various vehicle specific applications.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A head-up display system, comprising:
a hologram projector adapted to project a holographic image;
a waveguide positioned in front of the hologram projector, wherein the holographic image projected by the hologram projector passes through the waveguide;
a glare control prism positioned relative to the waveguide, wherein the holographic image projected by the hologram projector exits the waveguide and passes through the glare control prism, the glare control prism is adapted to allow the holographic image projected by the hologram projector to pass from the waveguide through the glare control prism and to prevent ambient light that hits the glare control prism from passing through the glare control prism to the waveguide; and
a waveplate positioned between the waveguide and the glare control prism, the waveplate adapted to adjust the polarization of the holographic image.

2. The head-up display system of claim 1, wherein the waveplate is adapted to adjust the ratio of s-polarization to p-polarization in the holographic image projected through the waveplate.

3. The head-up display system of claim 2, wherein the waveplate is adapted to adjust the ratio of s-polarization to p-polarization in the holographic image projected through the waveplate to a pre-determined ratio that is between 5:1 and 15:1.

4. The head-up display system of claim 3, wherein the waveplate includes an inorganic birefringent film.

5. The head-up display system of claim 3, wherein the waveplate comprises a liquid crystal lens connected to a voltage source, wherein the birefringent characteristics of the liquid crystal lens vary as the voltage supplied to the liquid crystal lens is varied.

6. The head-up display system of claim 4, wherein the inorganic birefringent film comprises columnar nanostructures.

7. The head-up display system of claim 6, wherein the columnar nanostructures are formed on the waveplate by oblique deposition.

8. The head-up display system of claim 6, wherein the inorganic birefringent film is grown directly on the glare control prism.

9. The head-up display system of claim 6, wherein the inorganic birefringent film is laminated to the glare control prism.

10. The head-up display system of claim 1, wherein the holographic image propagates inside the waveguide and is extracted multiple times, expanding an eye-box and magnifying the projected holographic image.

11. A waveguide assembly, comprising:
a waveguide adapted to be positioned in front of a hologram projector, wherein a holographic image projected by the hologram projector passes through the waveguide;
a glare control prism positioned relative to the waveguide assembly, wherein the holographic image projected by the hologram projector exits the waveguide and passes through the glare control prism, the glare control prism adapted to allow a holographic image to pass from the waveguide through the glare control prism and to prevent ambient light that hits the glare control prism from passing through the glare control prism to the waveguide; and
a waveplate positioned between the waveguide and the glare control prism, the waveplate adapted to adjust the polarization of a holographic image passing through the waveguide.

12. The waveguide assembly of claim 11, wherein the waveplate is adapted to adjust the ratio of s-polarization to p-polarization in a holographic image projected through the waveplate.

13. The waveguide assembly of claim 12, wherein the waveplate is adapted to adjust the ratio of s-polarization to p-polarization in the holographic image projected through the waveplate to a pre-determined ratio that is between 5:1 and 15:1.

14. The waveguide assembly of claim 13, wherein the waveplate includes an inorganic birefringent film.

15. The waveguide assembly of claim 13, wherein the waveplate includes a liquid crystal lens connected to a voltage source, wherein the birefringent characteristics of the liquid crystal lens vary as the voltage supplied to the liquid crystal lens is varied.

16. The waveguide assembly of claim 14, wherein the inorganic birefringent film comprises columnar nanostructures.

17. The waveguide assembly of claim 16, wherein the inorganic birefringent film is one of grown directly on the glare control prism, and laminated to the glare control prism.

18. The waveguide assembly of claim 16, wherein the columnar nanostructures are formed on the waveplate by oblique deposition.

19. The waveguide assembly of claim 11, wherein the holographic image propagates inside the waveguide and is extracted multiple times, expanding an eye-box and magnifying the projected holographic image.

20. A head-up display system, comprising:
a hologram projector adapted to project a holographic image;
a waveguide positioned in front of the hologram projector, wherein the holographic image projected by the hologram projector passes through the waveguide;
a glare control prism positioned relative to the waveguide assembly, wherein the holographic image projected by the hologram projector exits the waveguide and passes through the glare control prism, and the glare control prism is adapted to allow the holographic image projected by the hologram projector to pass from the waveguide through the glare control prism and to prevent ambient light that hits the glare control prism from passing through the glare control prism to the waveguide; and
a waveplate positioned between the waveguide and the glare control prism, the waveplate adapted to adjust the ratio of s-polarization to p-polarization in the holographic image projected through the waveplate, wherein the waveplate is one of:
an inorganic birefringent film comprising columnar nanostructures that are formed by oblique deposition that is one of grown directly on the glare control prism, and laminated to the glare control prism; and
a liquid crystal lens connected to a voltage source, wherein the birefringent characteristics of the liquid crystal lens vary as the voltage supplied to the liquid crystal lens is varied.

* * * * *